April 12, 1966 C. W. JASMER ETAL 3,245,718
SELF ADJUSTING SEAT BELT
Filed Sept. 8, 1964
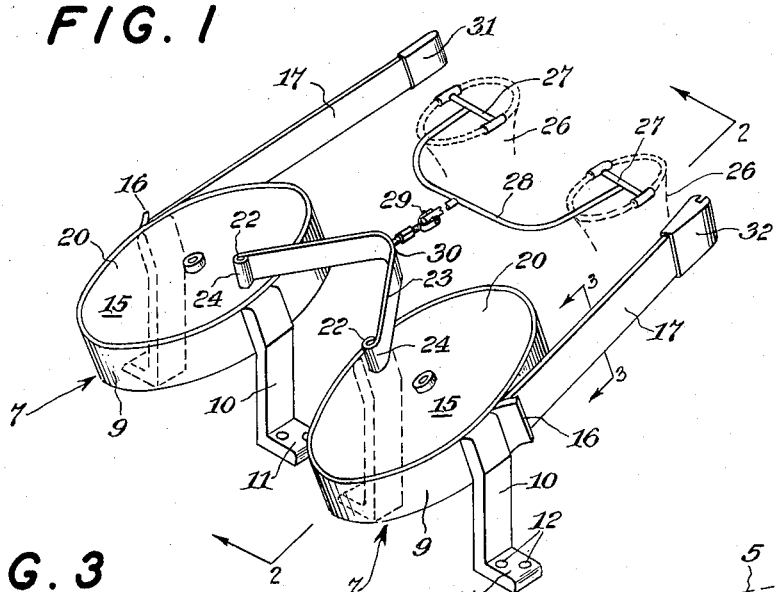
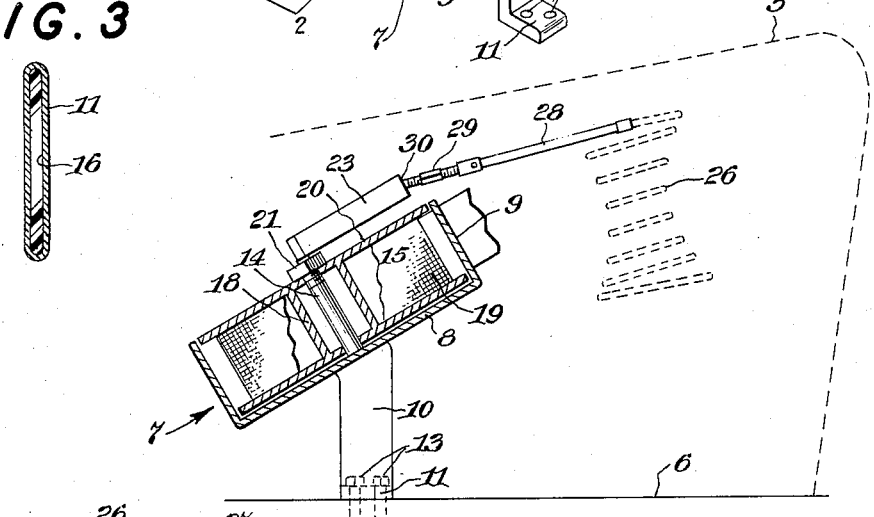
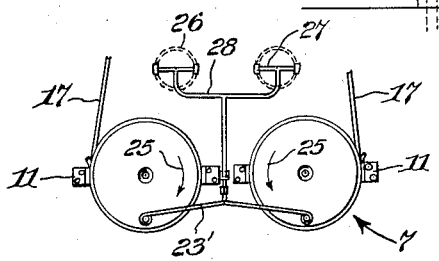
INVENTORS
CLARENCE W. JASMER
META JASMER

# United States Patent Office 3,245,718
Patented Apr. 12, 1966

3,245,718
SELF ADJUSTING SEAT BELT
Clarence W. Jasmer and Meta Jasmer, both of
Rte. 1, Fairchild, Wis.
Filed Sept. 8, 1964, Ser. No. 394,887
4 Claims. (Cl. 297—388)

This invention relates to safety belts, and particularly to a novel adjustment device which is responsive to the weight of the person using the seat belt.

The safety belt has become a very important accessory in motor vehicles, and is responsible for saving the lives of many persons involved in highway accidents. An important factor often overlooked when wearing a seat belt is the tightness of the belt about the person's waist. For maximum safety, the belt should be adjusted in tension depending on the weight of the person using the belt, and it is the purpose of this invention to provide an adjusting device which is responsive to the weight of the person such that the belt will perform with maximum efficiency in the event of accident.

It is therefore a primary object of this invention to provide a tension adjusting device for seat belts which is responsive to the weight of the person using the belt, and which utilizes the displacement of the seat springs.

A further object of the invention is to provide a seat belt which will automatically tighten upon being subjected to sudden stresses and thereby ensure that the user is retained firmly in his seat.

A still further object of this invention is to provide a seat belt tension adjusting device which is mounted within the body of the seat so as to avoid obstruction within the vehicle and further afford protection to the mechanism involved.

A full understanding of the construction of this invention, together with further novel features and advantages, will be had from the following detailed description of a preferred embodiment thereof, taken in conjunction with the attached drawings wherein:

FIG. 1 is a perspective view of the assembled device which comprises our invention.

FIG. 2 is a cross sectional side elevation taken along the lines 2—2 of FIG. 1.

FIG. 3 is a fragmentary cross sectional view showing the opening in the belt drum through which the seat belt extends.

FIG. 4 is a plan view of the mechanism shown in the no load extended condition.

Similar reference characters indicate corresponding parts throughout the several views in the drawings.

Referring now to the drawings in detail, the numeral 5 represents the broken outline of the seat portion of a vehicle seat which is mounted on the floor 6 of a vehicle. Two stationary cylindrical drums 7 are constructed from flat circular plate 8 having normally protruding cylindrical walls 9. The drums are mounted within the body of the seat at an acute angle with the floor 6 by means of brackets 10 which are welded to diametrically opposite portions of the cylindrical walls 9 and extend downwardly therefrom to terminate with flanges 11 which are suitably drilled at 12 to receive bolts 13 which secure the brackets firmly to the floor and framework of the vehicle. The drums 7 are open at the upper edge of the cylindrical walls 9 and bearing posts 14 upstand from the centers of the plates 8 to rotatably receive belt take-up reels 15 which are housed within the drums 7. A slotted opening 16 is formed adjacent the outermost brackets 10 so as to receive seat belts 17 therethrough.

The take-up reels 15 have a central hub portion 18 and a cylindrical belt mounting drum 19 which are supported on opposite sides by parallel spaced disc flanges 20. The reels are retained on the bearing posts 14 by means of nuts 21 which threadably engage on the end of the posts.

The reels are adjusted by means of pins 22 which project from the uppermost of the disc flanges 20 inwardly spaced from the outer periphery thereof. A spring strap 23 is looped at each end 24 so as to engage around the pins 22 for controlling the rotative position of the two take-up reels 15. The spring strap is tempered so as to extend substantially straight as indicated at 23' in FIG. 4, when in the unstressed condition. During movement from the position shown in FIG. 1, to the position shown in FIG. 4, it will be appreciated that the two seat belts 17 will move into the fully extended position due to rotation of the take-up reels in the direction indicated by the arrows 25.

Two regular coiled seat springs 26 are mounted with cross braces 27 which are secured across the uppermost coil of each spring. These cross braces are connected by means of a U shaped yoke 28 which extends rearwardly of the seat and is connected at its centre by means of an adjustable tie rod 29 to the centre 30 of the spring strap 23. The seat belts 17 terminate with male and female clasp portions 31 and 32 respectively of any conventional design for connecting the belts in a single loop around a person's waist.

In operation, it will be clear that the weight of a person on the seat 5 will depress the seat springs 26 which in turn will cause the spring strap 23 to be flexed into the general configuration shown in FIG. 1, and thereby cause the take-up reels 15 to rotate through approximately one quadrant and thereby draw each of the belts inwardly through the slotted openings 16 to tighten the closed belt around the user. The degree of deflection of the spring strap 23 and the resulting arc through which the take-up reels are rotated will be dependent on the weight of the user and in this way the device becomes self adjusting so as to ensure a safe and firm hold around the waist. The sudden impact caused by an accidental will result in further depression of the seat springs 26 which will cause an immediate tightening of the belt so as to positively retain the user firmly in his seat.

Having described the invention in a preferred form, it will be appreciated that some modifications may be made to the precise configuration, without departing from the scope or spirit of the invention, as defined by the following claims.

We claim:

1. A load sensitive seat belt adjusting device for mounting within a vehicle seat having coiled springs, and comprising, two cylindrical drums, brackets extending from the drums and secured to the floor of the vehicle, bearing posts upstanding centrally of the drums, belt take-up reels rotatably mounted on the posts and housed within the drums, belts passing through slots formed in the sides of the drums and secured about the reels, pins upstanding from the reels and projecting above the drums adjacent the periphery thereof, a spring strap secured at its ends to said pins and urging the reels to rotate in opposite directions to pay out the belts coiled around the reels, a yoke connecting adjacent coil springs in the seat, and a tie rod connecting the centre of the yoke with the centre of the spring strap causing said strap to flex and rotate said reels in response to weight applied to the coil springs.

2. A load sensitive belt adjusting device according to claim 1, wherein said drums are positioned at an acute angle with respect to the floor so as to slope upwardly towards the front of the seat.

3. A load sensitive belt adjusting device according to claim 2, wherein said tie rod is adjustable and wherein said drums are positioned beneath the seat.

4. A seat belt tension adjusting device sensitive to the weight of the user, and comprising, two cylindrical drums located beneath a seat at an acute angle sloping upwardly towards the front of the seat, brackets extending downwardly from the sides of the drums to secure the same to the floor, a belt take-up reel rotatably mounted within each drum, a belt secured to the periphery of each reel and extending through a slot formed in the periphery of each drum, a post upstanding from the periphery of each reel, a spring strap secured at its ends to the posts and loaded to urge said reels to rotate in opposite directions to pay out the belts through the slots, a yoke extending between two springs in the seat and disposed forwardly of the drums, an adjustable tie rod connecting the centre of the spring strap with the centre of the yoke such that said strap is flexed in response to compression of the seat springs.

References Cited by the Examiner
UNITED STATES PATENTS

| | | | |
|---|---|---|---|
| 3,128,124 | 4/1964 | Fredericks et al. | 297—388 |
| 3,199,918 | 8/1965 | Nakolan | 297—388 |

CASMIR A. NUNBERG, *Primary Examiner.*

J. S. PETRIE, *Assistant Examiner.*